United States Patent [19]

Broom et al.

[11] Patent Number: 4,669,076
[45] Date of Patent: May 26, 1987

[54] OPTICAL DISK DRIVE APPARATUS WITH MEANS FOR ACCURATE DISK POSITIONING

[75] Inventors: Walter E. Broom, Boulder, Colo.; Michael Henry, Tucson, Ariz.; William J. Schaffer, Loveland, Colo.

[73] Assignee: International Business Machines Corporation, a corporation of New York, Armonk, N.Y.

[21] Appl. No.: 793,034

[22] Filed: Oct. 30, 1985

[51] Int. Cl.⁴ .............................................. G11B 1/00
[52] U.S. Cl. .................................. 369/77.1; 369/75.1; 369/270
[58] Field of Search ............... 369/270, 271, 75.1, 369/75.2, 77.1, 77.2; 360/99

[56] References Cited

U.S. PATENT DOCUMENTS

| | | | |
|---|---|---|---|
| 2,670,210 | 2/1954 | Thompson | 369/77.1 |
| 2,927,794 | 3/1960 | Carson | 369/77.1 |
| 4,040,106 | 8/1977 | Medley | 360/99 |
| 4,068,851 | 1/1978 | Yamamura | 369/270 |
| 4,139,876 | 2/1979 | Owens | 360/97 |
| 4,339,778 | 7/1982 | Wise | 360/99 |
| 4,499,477 | 2/1985 | Davies | 346/137 |
| 4,509,157 | 4/1985 | Morinaga | 369/270 |
| 4,538,258 | 8/1985 | Miyako et al. | 369/271 |
| 4,539,668 | 9/1985 | Izumi et al. | 369/75.2 |
| 4,592,040 | 5/1986 | Ohsaki | 369/270 |

Primary Examiner—Steven L. Stephan
Attorney, Agent, or Firm—Jeffrey S. LaBaw; Curtis G. Rose; F. A. Sirr

[57] ABSTRACT

A front-loading optical disk drive is disclosed that registers an optical disk about the spindle precisely relative to the optical head. First, the spindle and the corresponding clamping assembly have means to accurately register the disk onto the spindle. Second, the critical components of the optical disk drive such as the spindle, the clamping assembly, the optical head, and the guides and stops for the optical disk, are all positioned relative to a single point in the disk drive. This eliminates the build up of manufacturing tolerances between the critical components. By precisely registering the optical disk onto the spindle, and precisely positioning all the critical components relative to a single point, the optical disk will be precisely registered to the optical head.

2 Claims, 8 Drawing Figures

OPTICAL DISK DRIVE APPARATUS WITH MEANS FOR ACCURATE DISK POSITIONING

DESCRIPTION

1. Field of the Invention

This invention relates to optical disk drives and more particularly to an optical disk drive that precisely registers an optical disk relative to the optical head.

2. Background Art

A front loading optical disk drive is similar in concept and operation to magnetic or "floppy" disk drives. Typically, a front loading disk drive has a cover or door which is lifted or opened for manually inserting a disk into the disk drive. A drive spindle and clamping assembly is provided so that a center hole in the disk can be engaged between the spindle and the clamp. When the door is opened or cover lifted, the drive spindle and clamp move away from each other to allow the loading or unloading of a disk between them. After loading the disk, the spindle and clamp are pivoted toward each other for engagement with the disk and each other by closing or lowering the door. During operation of the disk drive, a drive motor rotatively drives the spindle and the disk which is clamped to the spindle.

FIG. 1 shows a common spindle 290, clamp 280, and disk 200 arrangement well known in the prior art. The spindle 290 has a center pin 286 that aligns with a recess 281 in the clamp. The inner periphery 211 of the disk 200 is centered by the spindle cone 292. The flat surface 284 of the clamp 280 clamps the disk 200 to the spindle 290. During this clamping action, the disk is located only by its inner periphery 211 on the spindle cone 292. During the clamping action, the inner periphery 211 of the disk 200 has a tendency to move in contact with the spindle cone 292 during centering. A serious problem arises in that this contact may damage the inner periphery of the disk. The damaged inner periphery may no longer define a perfect centering hole in the disk, thereby causing inaccuracies in the centering of the disk on the spindle. This illustrates one of the problems with previous disk drives: the precise registration of the disk onto the spindle. If the disk is not properly positioned, the center hole in the disk will not position properly with the driving spindle and clamp.

Another problem with these previous disk drives is that the critical components become misaligned relative to each other due to the build up of manufacturing tolerances. There is a greater exposure for this misalignment if the critical components are mounted on separate parts that are pivoted relative to each other. As in the case with disk drives in the prior art, it is typical for the spindle and clamp to be mounted on separate parts that are hinged together to allow the two parts to pivot away or towards each other. The clamping assembly is typically mounted into a frame that is pivotally mounted at two points to a base frame supporting the spindle. Because these two parts pivot relative to each other about two points, there is an exposure for misalignment between the critical components due to a build up of manufacturing tolerances. This makes manufacture of the disk drives more difficult and more costly. In addition, having misalignment between the critical components makes the operation of the disk drive less reliable.

The typical critical components include the spindle, the optical head, and the clamp or collet that holds the disk into engagement with the spindle. A critical component may be any component that affects the registration of the disk relative to the sensing head. The precise registration of these parts is difficult due to the build up of manufacturing tolerances.

These previous disk drives are inherently less reliable because they have failed to precisely register a disk relative to the sensing head. This is due to the presently existing conditions in disk drives as stated above. First of all, previous disks have failed to accurately center a disk onto the spindle. Secondly, the critical components have not been precisely positioned due to a build up of manufacturing tolerances.

Another problem is unique to optical disk drives. Since optical disk drives employ a laser source, it is important that the disk drive forms a sealed enclosure to prevent any laser rays from escaping. The optical disk must be totally enclosed by the disk drive during operation to ensure this sealed enclosure. Previously, this has required an added eject mechanism to eject the optical disk from within the disk drive to a position far enough out of the disk drive to manually grab the optical disk for removal after its operation. A problem with an eject mechanism is that it requires more parts which makes the drive mechanism more costly and less reliable.

SUMMARY OF THE INVENTION

It is, therefore, an object of this invention to register an optical disk onto a spindle precisely relative to the optical head in an optical disk drive.

It is a further object of this invention to precisely center a disk onto a spindle without damage to the disk.

It is a further object of this invention to position all critical components of the disk drive with a minimum amount of tolerance build up.

It is a further object of this invention to seal the disk drive during operation to prevent laser rays from escaping while still being able to manually remove the optical disk from the disk drive after operation without an eject mechanism.

It is a further object of this invention to reduce the cost of manufacturing a disk drive while increasing its operational reliability.

In accordance with the above stated objectives, and to overcome the problems stated in the background art, an optical disk drive comprises a single pivot point from which all critical components are positioned, means for precisely registering a disk onto a spindle, and a door having a protruding portion that encases the optical disk in a closed operating position and allows manual removal of the optical disk in an open position.

All critical components in the disk drive are mounted onto a loading frame, top cover, or base frame member. The loading frame, top cover, and base frame member have a common locating point to minimize tolerance buildups. This common locating point comprises a single pivot point such as a ball and socket joint. All critical components in the disk drive include those components that affect the registration between the disk and the optical head. These components include the optical head, the head carriage rail, the spindle, the clamping collet and all stops and guides for positioning the optical disk in the disk drive. These components are positionally mounted relative to the ball and socket joint. Registering the position of the critical components such as the head carriage guide rail, the spindle, and the clamping collet to a single point, such as a ball and socket joint, simplifies manufacture and lowers the cost of manufacture.

The clamping collet is mounted onto a loading frame attached to the ball joint. The spindle, optical head, and the head carriage rail are positionally mounted to a base frame member having a socket joint for receiving the ball joint of the loading frame. These two frames pivot relative to each other allowing the clamping collet to accurately position the optical disk onto the spindle. The optical disk and the optical head are thereby registered to each other after the optical disk is loaded into the disk drive.

Means for precisely registering a disk onto a spindle comprises a spindle that has a straight portion and a surrounding surface such that the disk is constrained three-dimensionally, radially and axially, without damage to the inner periphery of the disk.

The disk drive door has a protruding portion that encases the optical disk and seals the disk drive during operation to prevent laser rays from escaping. Since the optical disk extends beyond the front face of the base frame member and into a cavity in the front door formed by the protruding portion, the disk can be manually removed from the disk drive without an eject mechanism when the door is in its open position.

DESCRIPTION OF THE PREFERRED EMBODIMENT

Figure 1:
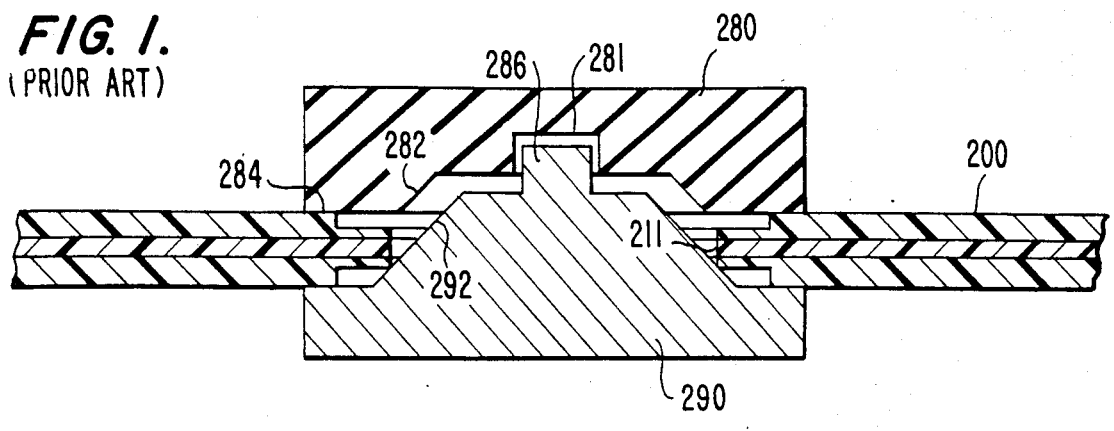
FIG. 1 shows a spindle, disk and clamp arrangement known in the art.
Figure 2:
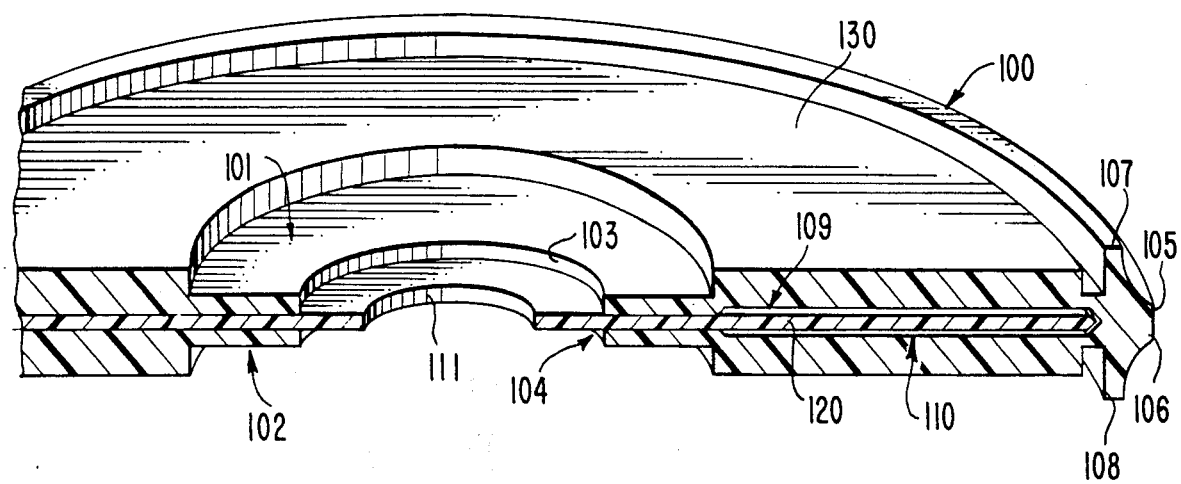
FIG. 2 shows an optical disk for loading into an optical disk drive.

For use in an optical disk drive, an optical disk 100 is illustrated in FIG. 2. The optical disk has essentially three layers. The center layer 120 is the substrate which comprises a locating hole having inner periphery 111 and certain recording features (not shown) such as the aluminized recording surface and tracking grooves. The other two layers form a cover assembly 130. This cover assembly has two identical disk-like halves 101, 102 each having a center aperture 103, 104 and an outer periphery 105, 106. Each half has an inner surface 109, 110 adapted to provide an air gap adjacent to the optical recordable coating on the disk medium 120. Each cover half is transparent to allow light to pass through. The cover assembly has a raised annulus 107, 108 near the outer periphery 105, 106 to support the assembly and minimize contact with the transparent portion. Hereafter, the term "disk" shall mean an optical disk enclosed in its transparent cover assembly.

Figure 3:
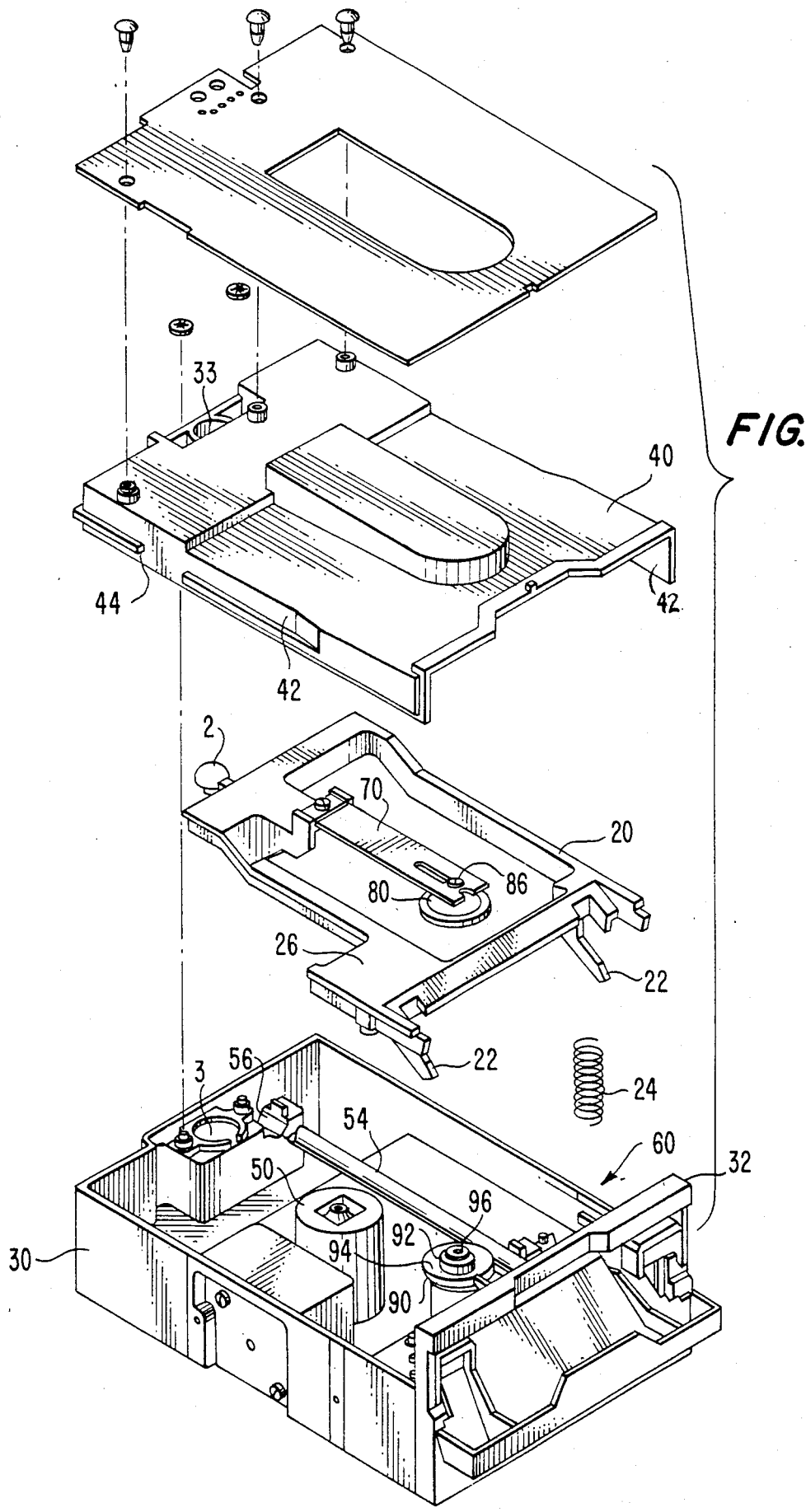
FIG. 3 is an exploded view of an optical disk drive.

A front loading optical disk drive is shown in FIG. 3. With slight modifications, elements of the optical disk drive described and claimed herein could apply to magnetic or "floppy" disk drives.

Referring to FIG. 3, the optical disk drive 60 of this invention comprises a ball 2 and socket 3. A loading frame 20 is suspended from the ball 2. The ball 2 and socket 3 form a pivot joint such that the loading frame 20 pivots on ball 2 in socket 3. This ball and socket joint form a single point hinge for the loading frame 20 relative to the base frame member 30 which contains the socket 3.

All the critical components are positioned relative to the ball 2 and socket 3 since together they define a single reference point. The term "critical components" is used herein to mean those components that affect the position of the optical disk relative to the optical head. The spindle 90 is mounted to the base frame member 30 and positioned from the socket 3. The optical head 50 is mounted (by means not shown) to slide on guide rail 54 which is supported and positioned by a v-mount 56. The v-mount is positioned from the socket 3 thus ensuring that the optical head 50 is positioned relative to the socket 3.

Attached to the loading frame 20 and positioned from the ball 2, is a spring lever arm 70. The spring lever arm 70 has at one end a collet 80 loosely coupled to it by a center pin 86. The collet 80 is positioned from the ball 2 the same distance the spindle 90 is positioned from the socket 3. This ensures that the collet 80 will match up with the spindle 90 during operation.

The top cover 40 has a molded socket 33 that pivotally constrains ball 2 in socket 3 when the top cover 40 is assembled over the loading frame 20 and onto the base frame member 30. The top cover 40 also has side guides 42 that are positioned relative to the ball and socket joint. The side guides 42 guide the optical disk into the disk drive as it is being loaded. The top cover 40 also has stops 44 at the back of the top cover 40 to control how far the disk can be inserted into the disk drive. The stops 44 are positioned relative to the ball and socket joint.

As a result, these critical components that affect the registration of the disk relative to the optical head are positioned relative to a single point pivot point. This eliminates a further tolerance variation that would exist between two points. Positioning from a single pivot point is possible with this ball and socket joint.

Figure 6:
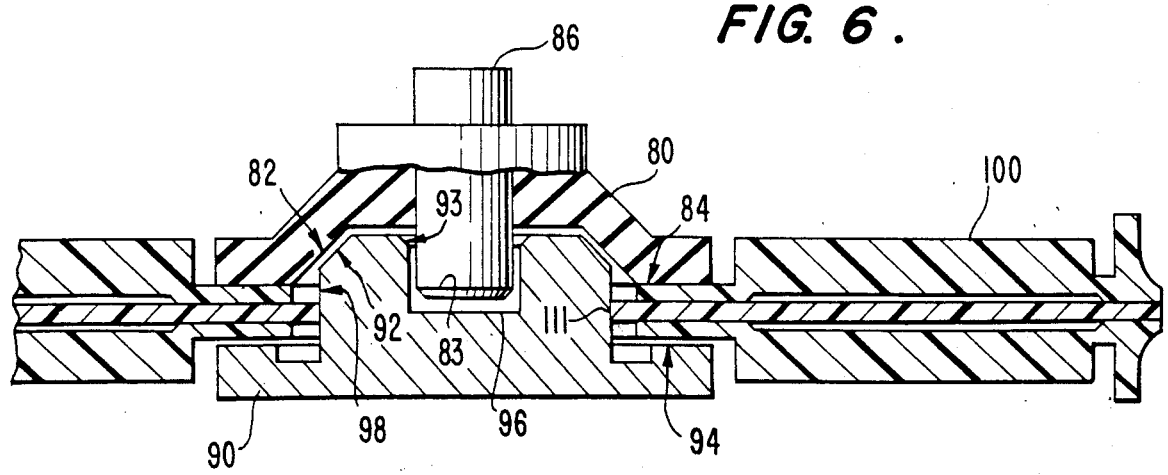
FIG. 6 shows a disk centered and clamped between a spindle and a collet.

As shown in FIG. 6, the collet 80 clamps an optical disk 100 onto the spindle 90. The collet 80 has an inner recess 82 and a center pin 86. Pin 86 engages recess 96 of spindle 90 to guide collet 80 as it is lowered onto the spindle. The pin 86 of collet 80 and the recess 96 of spindle 90 have corresponding beveled edges 83 and 93, respectively, to allow the collet 80 to center itself with the spindle 90. The collet 80 is loosely coupled to the spring lever arm 70 (FIG. 3) to allow the collet 80 to move relative to the spring lever arm 70 to enhance its centering engagement with the spindle 90. A clearance 82 is provided between collet 80 and spindle cone 92. The collet 80 is thus a self-centering pressure pad.

The precise geometry of the spindle of this invention enables the disk to be properly centered and registered about the spindle. The spindle 90 locates the disk 100 on the upper cylindrical portion 98 and the surrounding surface 94 of the spindle 90. The surrounding surface 94 positions the disk axially, in the direction of the axis of the collet and the spindle; and the upper cylindrical portion 98 positions the disk radially, in the direction of the radius of the disk. Thereby the disk is accurately positioned in two directions, axially and radially. These two directions are enough to constrain the disk three-dimensionally, thereby precisely registering the disk on the spindle. The spindle 90 thereby locates the disk on the upper cylindrical portion 98 and the surrounding face 94 rather than on the slanting surface of the spindle cone 92. This makes centering of the disk more precise, and does not damage the disk. As stated above in the Background Art, locating on the slanting surface of the spindle cone 92 makes centering harder to control and damages the inner periphery 111 of the disk.

The elements described above register an optical disk 10 onto a spindle precisely relative to an optical head in a disk drive. This is accomplished in two ways. First, the spindle accurately positions the disk on the upper cylindrical portion 98 and surrounding surface 94 of spindle 90 thus defining the registration of the disk both axially and radially. This is done without damage to the inner periphery of the disk. Secondly, all critical components of the disk drive that influence the position of the disk relative to the optical head are positioned from a single point. This single point is a ball and socket joint from which the loading frame pivots about the base frame member.

Figure 4:
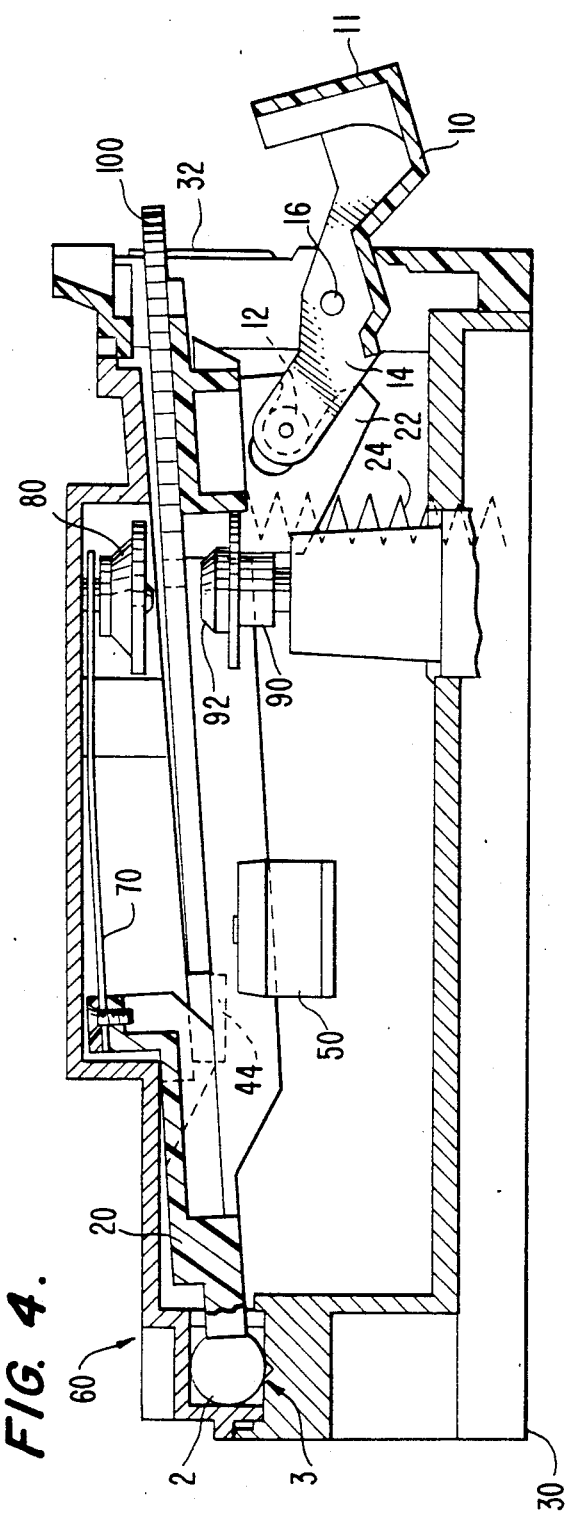
FIG. 4 shows a cross-sectional view of a disk drive in a position to load and unload an optical disk.

In order to remove a disk from the disk drive without an eject mechanism, the disk 100 extends beyond the front face 32 of the base frame member 30 as shown in FIG. 4. Additionally, because the disk extends partly beyond the front of the disk drive, the disk drive has more room inside for the other components. This enables the disk drive to be more efficiently packaged. The door 10 has a protruding portion 11 that protrudes outwardly to define a door cavity that encases the extending disk when the door is in its closed position. This seals off the disk drive so that no laser rays can escape. As door 10 is opened, the portion of the disk 100 that extends past the front face 32 can be manually grasped to pull the disk out of the disk drive. Since the disk 100 protrudes into the door cavity, the need for an eject mechanism is eliminated.

Figure 7:
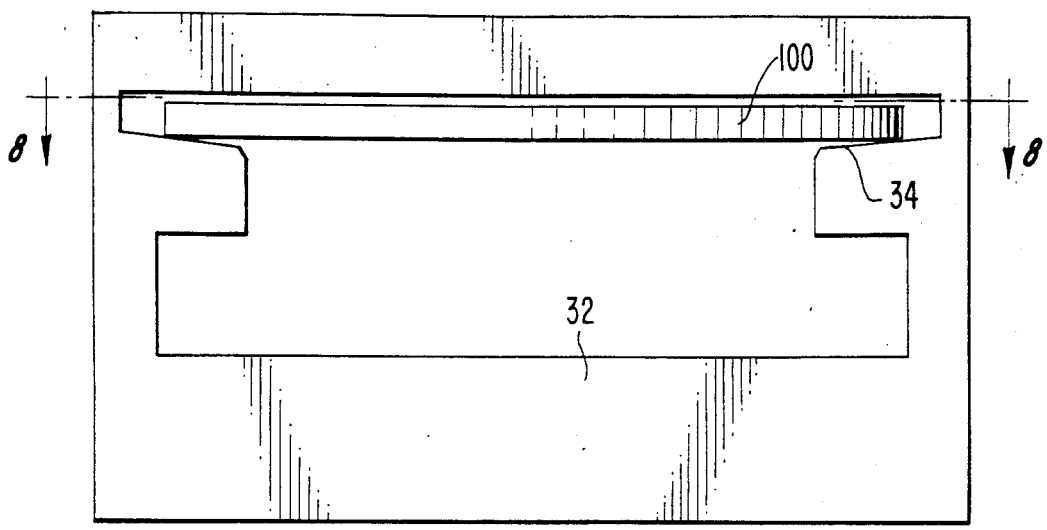
FIG. 7 shows a front view of the front face of a front loading disk drive during loading.
Figure 8:
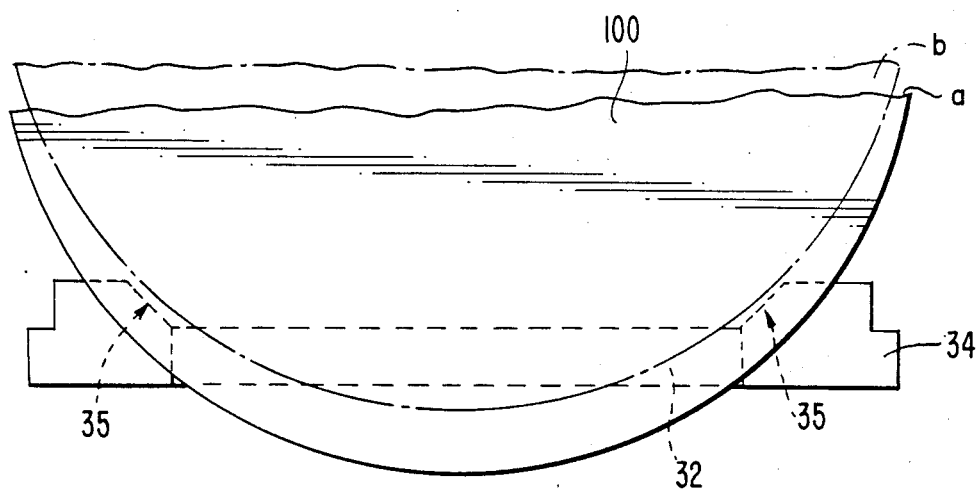
FIG. 8 shows a top view of the front face during loading taken along viewing line 8—8 of FIG. 7.

As shown in FIG. 7, a disk 100 slides along entry guides 34 of front face 32 and onto top surface 26 of loading frame 20 (FIG. 3) during loading and unloading. During inital loading and final unloading, the top surface 26 of loading frame 20 is at the same height as the surface of the entry guides 34. The entry guides 34 are angled to protect the surface of disk cover assembly 130 by providing essentially point contact to only the outer annular surface of the cover assembly during insertion of the disk. As shown in FIG. 8, which is taken along viewing line 8—8 in FIG. 7, the entry guides 34 have beveled corners 35. The beveled corners 35 allows a circular disk 100 which has been fully inserted into a disk drive, as shown by position "b" in FIG. 8, to clear the front face 32 as the top surface 26 of loading frame 20 lowers below the surface of the entry guides 34, while having a portion of the disk 100 extend past the front face 32 of the disk drive for manual removal of the disk 100 without utilizing an eject mechanism.

DESCRIPTION OF THE OPERATION

Figure 5:
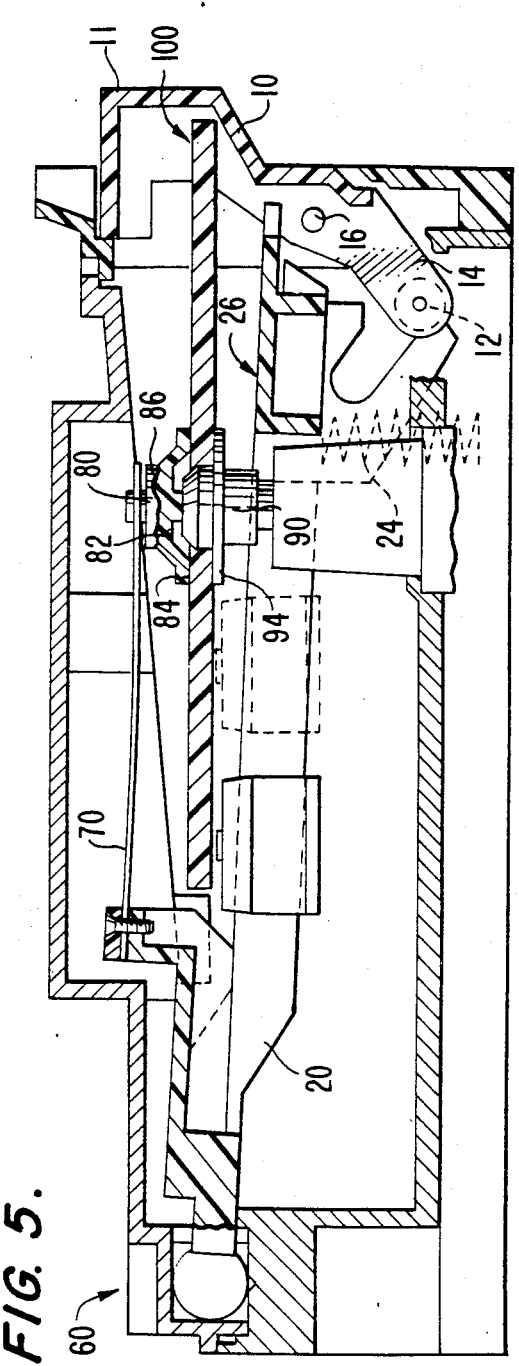
FIG. 5 shows a cross-sectional view of a disk drive with an optical disk registered relative to an optical head for actual operation.

The operation of the front loading disk drive of this invention is shown in FIGS. 4 and 5. The door 10 actuates the disk loading and clamping functions. As door 10 rotates downward about a pivot point 16 attached to front face 32, the loading frame 20 pivots on ball 2 and socket 3 joint. Springs 24, which are mounted between the base frame member 30 and the loading frame member 20, push loading frame 20 up. Springs 24 also hold door 10 open because cams 22 of loading frame 20 push on rollers 12 mounted on arms 14 of door 10. Only one spring 24 is shown in FIG. 3 to alleviate confusion. As shown in FIGS. 4 and 5 the second spring is hidden behind the spring 24 as shown.

The loading frame is essentially a three point suspension system. The first point comprises the ball and socket pivot point at the rear of the disk drive as described above. The second two points are at the front of the disk drive, and comprise cam surfaces 22 which engage roller 12. Similarly, both ends of the door pivot about a pivot point 16, the one hidden behind the other as shown in FIGS. 4 and 5 as pivot point 16. Again, the loading frame 20 has two cams each numbered 22, as shown in FIG. 3, since their functions are similar. Also, door 10 has two arms 14, one at each end of the door. Each arm 14 contains a roller 12. As such, the door 10 raises and lowers the loading frame at two points at the front of the disk drive such that the loading frame pivots about a single point at the rear of the disk drive.

With the loading frame 20 pivoted upward as shown in FIG. 4, the disk 100 will slide into the disk drive 60 on the top surface 26 (FIG. 3) of loading frame 20. The loading frame is pivoted upward high enough so that the disk drive does not strike the spindle 90 or optical head 50 as it is inserted into the disk drive.

Collet 80 is mounted onto spring lever arm 70. Spring lever arm 70 is mounted in a cantilevered fashion to loading frame 20. When the loading frame 20 is pivoted upward, spring lever arm 70 holds collet 80 far enough away from the disk surface so that the disk 100 does not hit the collet 80 during loading and unloading of the disk.

Disk 100 has a raised annulus 107, 108 (FIG. 2) near its outer periphery 105, 106 so that only the raised annulus 107, 108 makes contact with surface 26 of loading frame 20 during loading and unloading of the optical disk 100. In this way, the useable portions of the optical disk are not scratched during the loading and unloading of the disk 100. Damage to the recorded area of the disk is prevented since the disk 100 is guided and held by its circumference and raised annuli.

The disk 100 is guided into the drive 60 by side guides 42 (FIG. 3) which may be molded into the top cover 40. Also, stops 44, which may be molded at the back of top cover 40, control how far the disk 100 can be inserted into the drive. As the disk 100 hits the stops 44, the center aperture of the disk 100 should be substantially position-registered to spindle cone 92 of spindle 90. The disk 100 is positionally registered to the spindle since the stops 44 and side guides 42 of top cover 40, and top surface 26 of loading frame 20 are positioned relative to a single point, the ball and socket pivot joint. Additionally, the spindle 90 is positionally registered from this same single point, the ball and socket pivot joint. Therefore, the disk 100 which is positioned by the stops 44, side guides 42, and top surface 26 of loading frame 20 is positioned relative to the spindle with minimum buildup of manufacturing tolerances. The stops 44 and side guides 42 positionally registers the disk 100 within the tolerances of the spindle 90 since the stops 44, side guides 42, and spindle 90 are all positioned relative to the single pivot point, the ball and socket joint. The fine positioning of the disk 100 is achieved by the geometry of the spindle 90 and the collet 80 as further described herein.

As the door 10 is pivoted closed, the loading frame 20 lowers, loading the disk 100 onto the spindle 90, and clamping the disk 100 onto the spindle 90 with collet 80.

As the loading frame 20 lowers, the spindle cone 92 (FIG. 6) on spindle 90 picks up the center aperture of the disk 100. Spindle cone 92 guides the disk 100 until the inner periphery 111 of disk 100 is positioned by upper cylindrical portion 98 of spindle 90 and the surface of the disk 100 is positioned on surrounding surface 94 of spindle 90 as shown in FIG. 6.

As further illustrated in FIGS. 5 and 6, collet 80 has an inner recess 82 and a center pin 86. Center pin 86 engages recess 96 of spindle 90 to guide collet 80 as it is lowered onto the spindle. Inner recess 82 of collet 80 slips over spindle cone 92 of spindle 90. The flat surface 84 of collet 80 clamps the disk 100 to surrounding surface 94 of spindle 90.

As shown in FIG. 5, after door 10 closes and lowers loading frame 20, the top surface 26 of loading frame 20 is lower than the disk 100. As the disk 100 lowers onto the spindle and becomes clamped by the collet 80, the disk 100 lowers out of the way of the stops 44 and side guides 42 of top cover 40. The top surface 26 of loading frame 20 also lowers out of the way of the disk 100, no longer supporting the disk 100. The lowering of loading frame 20 puts a bending moment into spring lever arm 70 so that the collet 80 applies a load to the disk 100, thereby clamping the disk 100 to the spindle 90. In a preferred emboidment the collet exerts a one pound force during the clamping of the disk to the spindle. The disk 100 is solely supported in a clamped position by surrounding surface 94 and upper cylindrical portion 98 of spindle 90 and rotates with the spindle 90 as the spindle 90 is driven.

As shown in FIG. 5, springs 24 operate to hold door 10 closed by virtue of engagement between roller 12 and the lower profile of cam surface 22.

To unload the disk 100, the door 10 is pulled downward, and the disk is manually grasped at the portion that extends past the front face 32 of base frame member 30. No eject mechanism is required to remove the disk. As door 10 opens, the loading frame 20 rises. This lifts collet 80 away from the spindle 90. The top surface 26 comes into contact with the raised annulus 108 of the disk 100 and raises the disk clear of the optical head 50 and the spindle 90. The optical disk 100 only comes in contact with the side guides 42 of top cover 40 as the raised ring 108 of disk 100 slides along the top surface 26 of loading frame 20 during removal of the disk 100 from disk drive 60.

Although this invention has been particularly shown and described, it will be recognized that other changes in form may be made without departing from the spirit and scope of this invention. Such changes may include, but are not limited by, the following. For example, with slight modifications, elements of the optical disk drive described and claimed herein could apply to magnetic or "floppy" disk drives. Furthermore, as particularly shown within, the base frame member contained the socket joint, and the loading frame contained the ball joint. The scope of this invention further includes the base frame member containing the ball joint, and the loading frame containing the socket joint.

We claim:

1. An optical disk drive for receiving an optical disk having a raised annulus near its outer periphery for sliding contact with said disk drive during insertion and removal of the optical disk, said optical disk drive comprising:

a base frame member having a socket joint;

a ball mounted into said socket joint;

said ball and said socket forming a single common pivot point;

a disk loading frame suspended from said ball;

a front face connected to said base frame member;

said optical disk extending beyond said front face during play;

a door pivotally mounted to said front face for effectuating movement to said loading frame, said door having a closed position for lowering said loading frame, and said door having an opened position for raising said loading frame;

said door having a protruding portion which encases said optical disk when said door is in said closed position;

a spindle positionally mounted from said single common pivot point having a straight portion and a surrounding face for centering said optical disk; and a top cover mounted to said frame having stops positionally locatable from said single common pivot point.

2. An optical disk drive for receiving an optical disk comprising:

a frame having a front face;

an optical disk extending beyond said front face during play; and a door pivotally mounted to said front face having a protruding portion which encases said optical disk when said door is in said closed position to prevent laser rays from escaping during operation of the optical disk drive.

* * * * *